mechanism that canposed between the wind turbine blade and the rotor, the windturbine generator includes a pitch control mechanism that canadjust a pitch angle of the wind turbine blades, wherein sealmechanisms are mounted on both ends of opposed rollingbody holding surfaces of an outer race and an inner race of theblade rotating ring bearing with rolling bodies interposedbetween both the ends, sides of the seal mechanisms closer tothe blade are formed into a double sealed structure in which aspace is disposed between seal members and the seal memberare disposed in an axial direction of the blade, pressurizedfluid is supplied to the space, and lips of the seal members arepushed against a mating sidewall surface.

(12) United States Patent
Fujioka et al.

(10) Patent No.: US 8,212,372 B2
(45) Date of Patent: Jul. 3, 2012

(54) WIND TURBINE GENERATOR WITH SEAL MECHANISM

(75) Inventors: Yoshihiro Fujioka, Nagasaki (JP); Atsushi Imanaga, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 167 days.

(21) Appl. No.: 12/681,141

(22) PCT Filed: Feb. 12, 2010

(86) PCT No.: PCT/JP2010/052032
§ 371 (c)(1),
(2), (4) Date: Apr. 1, 2010

(87) PCT Pub. No.: WO2011/099139
PCT Pub. Date: Aug. 18, 2011

(65) Prior Publication Data
US 2011/0278851 A1    Nov. 17, 2011

(51) Int. Cl.
*F03D 9/00* (2006.01)
(52) U.S. Cl. .............................. 290/44; 290/55
(58) Field of Classification Search .................... 290/44, 290/45; 439/271
See application file for complete search history.

(56) References Cited

U.S. PATENT DOCUMENTS

| | | | |
|---|---|---|---|
| 3,888,357 A | 6/1975 | Bauer et al. | |
| 5,669,790 A * | 9/1997 | Carson et al. | 439/668 |
| 2007/0104577 A1 | 5/2007 | Hansen et al. | |
| 2008/0012346 A1* | 1/2008 | Bertolotti | 290/55 |
| 2010/0133854 A1* | 6/2010 | Jansen et al. | 290/1 C |
| 2010/0329867 A1* | 12/2010 | Patel et al. | 416/169 R |
| 2011/0142627 A1* | 6/2011 | Perkinson | 416/11 |

FOREIGN PATENT DOCUMENTS

| | | |
|---|---|---|
| JP | 49-80756 A | 8/1974 |
| JP | 2006-105297 A | 4/2006 |
| JP | 2009-516118 A | 4/2009 |
| WO | 2007061439 A2 | 5/2007 |

OTHER PUBLICATIONS

International Search Report of Application No. PCT/JP2010/052032 mailed Apr. 20, 2010.
Decision of patent grant issued in corresponding Korean application No. 2010-7008691 on Dec. 31, 2010.

* cited by examiner

*Primary Examiner* — Tho D Ta
(74) *Attorney, Agent, or Firm* — Kanesaka Berner & Partners, LLP

(57) ABSTRACT

The present invention provides a wind turbine generator in which an oil seal structure provided in a blade rotating ring bearing of a wind turbine blade is improved and leakage of lubricant oil to outside is prevented or suppressed. A wind turbine generator in which a rotor head has wind turbine blades, the rotor head rotates when the wind turbine blades receive wind power and drives a power generator disposed in a nacelle to generate electricity, the nacelle is disposed on an upper end of a tower that stands on a foundation such that the nacelle can yaw-slew, a blade rotating ring bearing is disposed between the wind turbine blade and the rotor, the wind turbine generator includes a pitch control mechanism that can adjust a pitch angle of the wind turbine blades, wherein seal mechanisms are mounted on both ends of opposed rolling body holding surfaces of an outer race and an inner race of the blade rotating ring bearing with rolling bodies interposed between both the ends, sides of the seal mechanisms closer to the blade are formed into a double sealed structure in which a space is disposed between seal members and the seal member are disposed in an axial direction of the blade, pressurized fluid is supplied to the space, and lips of the seal members are pushed against a mating sidewall surface.

3 Claims, 3 Drawing Sheets

WIND TURBINE GENERATOR WITH SEAL MECHANISM

RELATED APPLICATIONS

The present application is a National Phase of International Application Number PCT/JP2010/052032, filed Feb. 12, 2010, the disclosure of which is hereby incorporated by reference herein in its entirety.

TECHNICAL FIELD

The present invention relates to a wind turbine generator having a pitch control mechanism in which a pitch angle of wind turbine blades is variable, and more particularly, to a wind turbine generator in which an oil seal structure provided in a blade rotating ring bearing of wind turbine blades is improved.

BACKGROUND ART

The wind turbine generator is an apparatus in which a rotor head having wind turbine blades receives wind power and rotates, and electricity is generated by a power generator that is driven by accelerating this rotation by a gear box.

The rotor head is mounted on an end of a nacelle that is disposed on a wind turbine tower ("tower", hereinafter) and is capable of yaw-slewing, and the rotor head is supported such that the rotor head can rotate around a substantially horizontal lateral rotation axis.

A conventional wind turbine generator includes a pitch control system that varies a pitch angle of the wind turbine blades in accordance with a wind speed. The pitch control system sets an optimal pitch angle between the wind turbine blades in accordance with the wind speed, and controls a rotation speed of the rotor head.

In order to adjust the pitch angle of the wind turbine blades by the pitch control system, a blade rotating ring bearing that turnably supports the wind turbine blades with respect to the rotor head is used. A rolling bearing in which rolling bodies (ball bearing or rollers and the like) are disposed between an inner race and an outer race is employed as the blade rotating ring bearing.

In the blade rotating ring bearing, to prevent leakage of lubricant oil (grease) that lubricates a bearing sliding portion, oil seals are provided on both ends of bonding surfaces between the inner race and the outer race that constitute the bearing. That is, the bonding surfaces in which rolling bodies-holding surfaces (an outer peripheral surface of the inner race and an inner peripheral surface of the outer race) that sandwich the rolling bodies are opposed to each other at a predetermined gap from each other have exits of the gap that open toward both ends of the outer race and the inner race, and the exits are sealed by the oil seals.

The following patent literature 1 discloses to employ a labyrinth seal structure for preventing water or a foreign matter from entering a bearing box of the rolling bearing that is lubricated with grease.

CITATION LIST

Patent Literature

{PTL 1} Japanese Patent Application Laid-open No. 2006-105297

SUMMARY OF INVENTION

Technical Problem

In the conventional wind turbine generator, the oil seals of the blade rotating ring bearing at the both ends of the bonding surfaces of the outer race and the inner race have the same shapes (structures). Thus, if a centrifugal force is applied by rotation of the rotor head, the lubricant oil is prone to leak from the blade-side oil seal toward outside of the wind turbine blade.

That is, an outward centrifugal force is applied from inside of the blade rotating ring bearing to the oil seal on the side of the blade located on the side of the blade tip end in an axial direction of the wind turbine blade by rotation of the rotor head. Therefore, if the sealing function is not sufficient, lubricant oil in the blade rotating ring bearing receives the centrifugal force and is prone to leak outside of the bearing.

In the oil seal located inside of the rotor head (on the side of the rotor head in the axial direction of the wind turbine blade), since a centrifugal force is applied toward the rolling bodies in the blade rotating ring bearing by rotation of the rotor head, the lubricant oil is less prone to leak outside of the wind turbine blade.

From such a background, in the blade rotating ring bearing of the wind turbine generator, it is desired to improve the oil seal structure so that lubricant oil does not leak outside by influence of a centrifugal force generated by rotation of the rotor head.

The present invention has been accomplished in view of the above circumstances, and it is an object of the invention to provide a wind turbine generator in which the oil seal structure provided in the blade rotating ring bearing of the wind turbine blades is improved and leakage of lubricant oil to outside is prevented or suppressed.

Solution to Problem

To solve the above problem, the present invention employs the following means.

In the wind turbine generator of the present invention, a rotor head has wind turbine blades, the rotor head rotates when the wind turbine blades receive wind power and drives a power generator disposed in a nacelle to generate electricity, the nacelle is disposed on an upper end of a tower that stands on a foundation such that the nacelle can yaw-slew, a blade rotating ring bearing is disposed between the wind turbine blade and the rotor, the wind turbine generator includes a pitch control mechanism that can adjust a pitch angle of the wind turbine blades, seal mechanisms are mounted on both ends of opposed rolling body holding surfaces of an outer race and an inner race of the blade rotating ring bearing with rolling bodies interposed between both the ends, sides of the seal mechanisms closer to the blade are formed into a double sealed structure in which a space is provided between seal members and the seal members are disposed in an axial direction of the blade, pressurized fluid is supplied to the space, and lips of the seal members are pushed against a mating sidewall surface.

According to the wind turbine generator, the seal mechanisms are mounted on the both ends of the opposed rolling body holding surfaces of the outer race and the inner race of the blade rotating ring bearing with the rolling bodies interposed between both the ends, the sides of the seal mechanisms closer to the blade are formed into the double sealed structure in which the space is disposed between the seal members and the seal members are disposed in an axial direction of the blade, the pressurized fluid is supplied to the space, and the lips of the seal members are pushed against the mating sidewall surface. Therefore, strong seal structures can be formed in both a direction oriented outward from the rolling bodies and a direction oriented toward the space from outside.

Here, the sides of the seal members closer to the blade means bonding surface ends that are tip end sides (outsides) of the wind turbine blade in the blade rotating ring bearing in which the wind turbine blades are turnably supported by the rotor head so that the pitch angle can be adjusted. Therefore, a bonding surface end opposite from the blade side is an inner side of the rotor head, and the inner side of the rotor head means a side of a rotation center axis (inner side) of the rotor head in a blade rotating ring bearing in which the wind turbine blades are turnably supported by the rotor head so that the pitch angle can be adjusted.

In this invention, it is preferable that the pressurized fluid is compressed air supplied from a special compressor disposed in the rotor head. With this, it is possible to always stably supply the compressed fluid.

In the invention, it is preferable that the pressurized fluid is compressed air accumulated in a pressure tank disposed in the rotor head. With this, it is possible to stably supply the compressed fluid without consuming electricity generated by the wind turbine generator. In this case, a compressor can be connected from outside, for example, at the time of periodic inspection, and the compressed fluid can be accumulated in a pressure tank.

Advantageous Effects of Invention

According to the invention, the seal mechanism mounted on the blade-side of the rolling body holding surfaces of the blade rotating ring bearing is formed into a double sealed structure in which the space is provided between the seal members and the seal members are disposed in the blade axial direction, pressurized fluid is supplied to the space between the seal members and the lips of the seal members are pushed against a mating sidewall surface. Therefore, strong seal structures can be formed in both a direction oriented outward from the side of the rolling body (direction in which lubricant oil in the bearing flows outward by a centrifugal force) and a direction oriented toward the space from the outside (direction in which rain water or the like enters the bearing).

As a result, even if a centrifugal force is received when the wind turbine generator is operated, the strong seal that prevents lubricant oil in the bearing from flowing outside and the strong seal that prevents rain water or the like from entering the bearing can be formed at the same time. Therefore, leakage of lubricant oil in the bearing toward outside from the blade-side seal member can be prevented or suppressed.

Therefore, the oil seal structure provided in the blade rotating ring bearing of the wind turbine blade can be improved, an amount of lubricant oil that leaks outside from the blade rotating ring bearing can be minimized and with this, it is possible to provide a reliably wind turbine generator having high durability.

DESCRIPTION OF EMBODIMENT

An embodiment of a planet bearing structure of a wind turbine generator according to the present invention will be described based on the drawings below.

Figure 3:
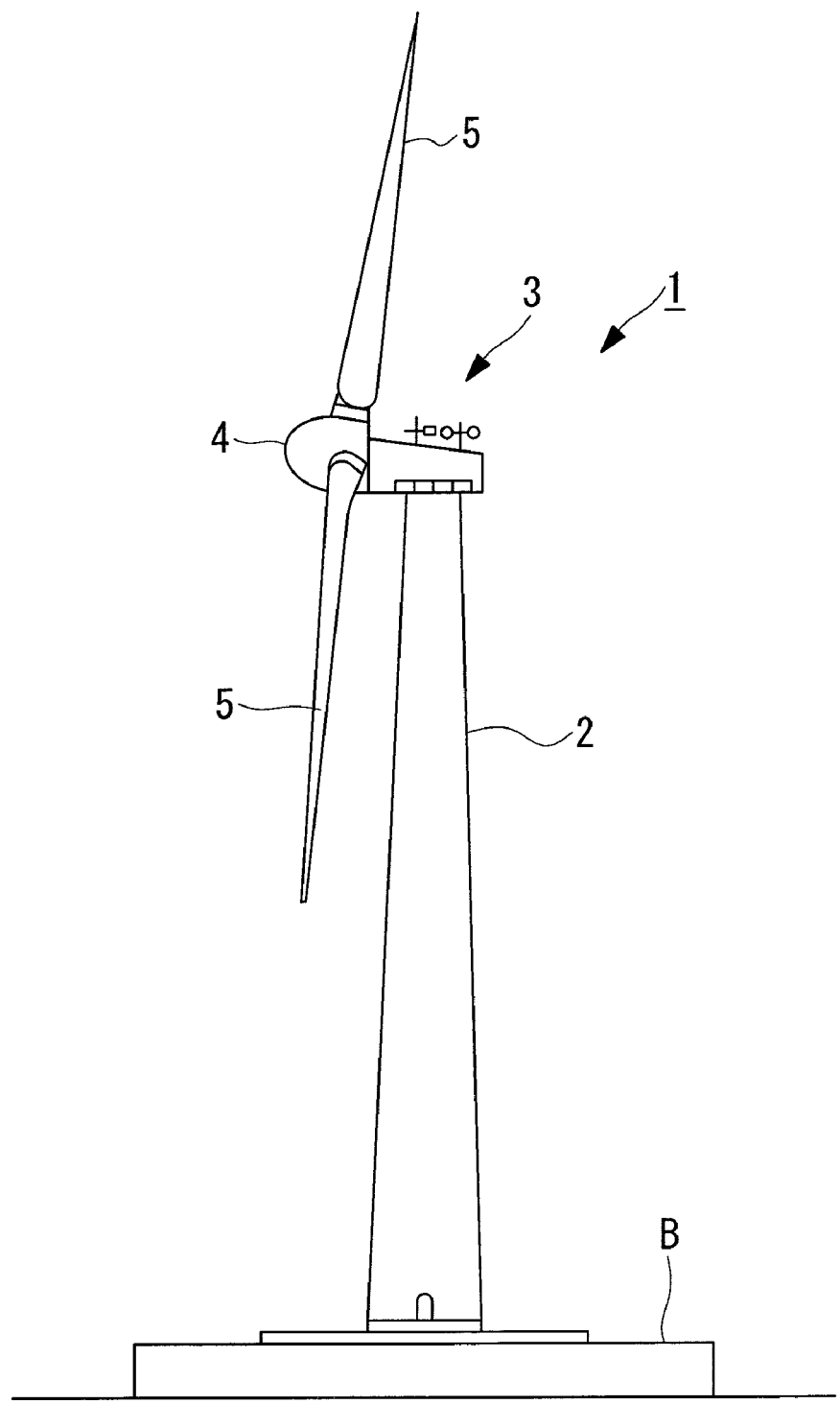
FIG. 3 is a schematic side view showing the wind turbine generator.

A wind turbine generator 1 shown in FIG. 3 includes a wind turbine tower ("tower", hereinafter) 2 standing on a foundation B, a nacelle 3 disposed on an upper end of the tower 2, and a rotor head 4 supported such that the rotor head 4 can rotate around a substantially horizontal lateral rotation axis and provided on a front end of the nacelle 3.

A plurality of (three for example) wind turbine blades 5 are mounted on the rotor head 4 radially around its rotation axis. With this, a wind power that hits the wind turbine blades 5 from the direction of the rotation axis of the rotor head 4 is converted into power that rotates the rotor head 4 around the rotation axis.

An anemometer that measures a peripheral wind speed and an anemoscope that measures a wind direction are disposed in places on an outer peripheral surface of the nacelle 3 (such as its upper portion).

That is, in the wind turbine generator 1, the wind turbine blades 5 receive a wind power, the rotor head 4 rotates around the substantially horizontal rotation axis, the rotor head 4 drives the power generator (not shown) disposed in the nacelle 3 to generate electricity, the nacelle 3 is disposed on the upper end of the tower 2 that stands on the foundation B, and the nacelle 3 can yaw-slew.

The illustrated tower 2 is of steel monopole, and the tower 2 is formed into a cylindrical tower having a necessary length (height) by connecting flanges (not shown) of a plurality of divided tower sections to each other.

Figure 1:
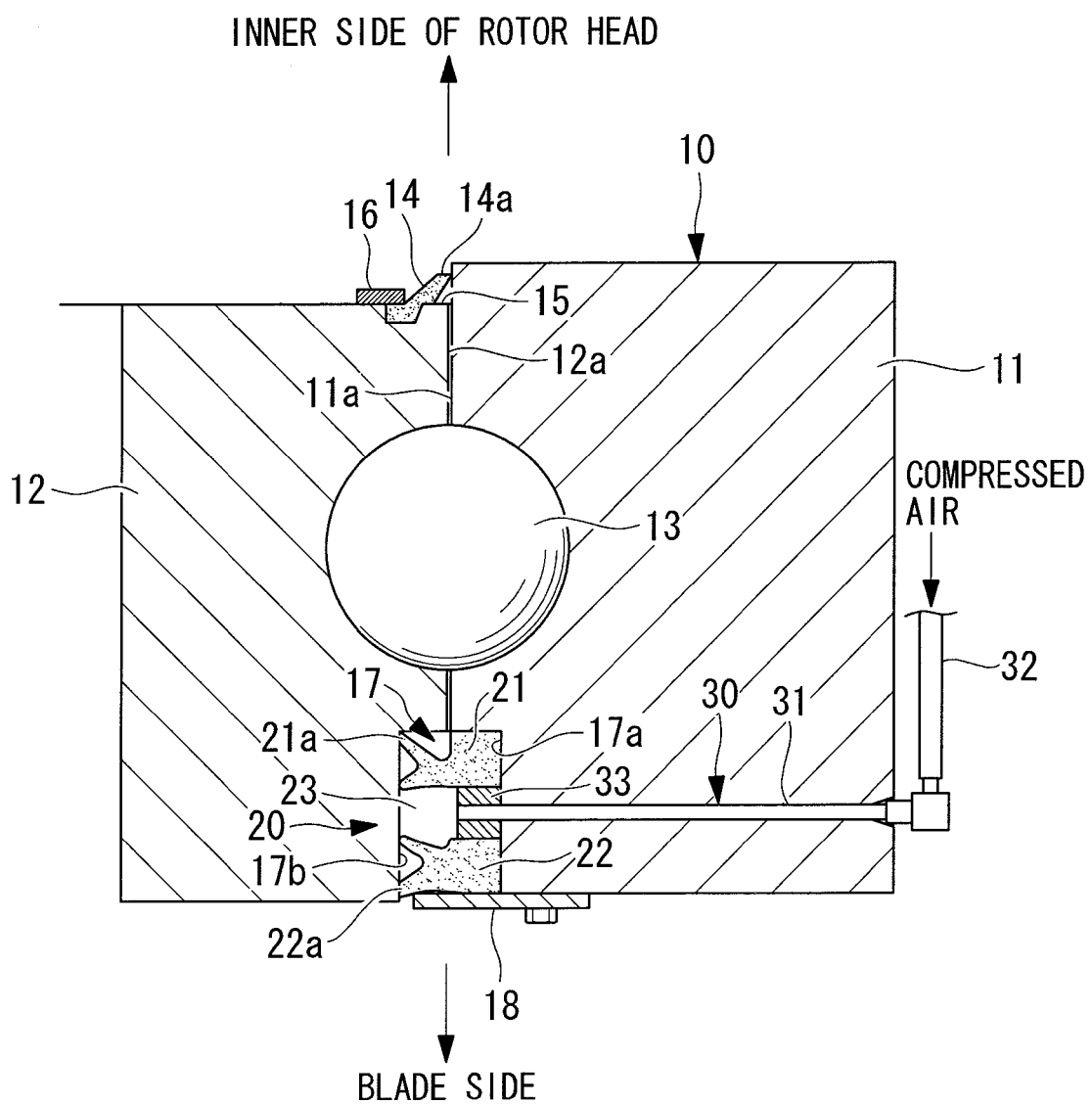
FIG. 1 is a sectional view of an essential portion showing an oil seal structure of a blade rotating ring bearing as an embodiment of a wind turbine generator according to the present invention.
Figure 2:
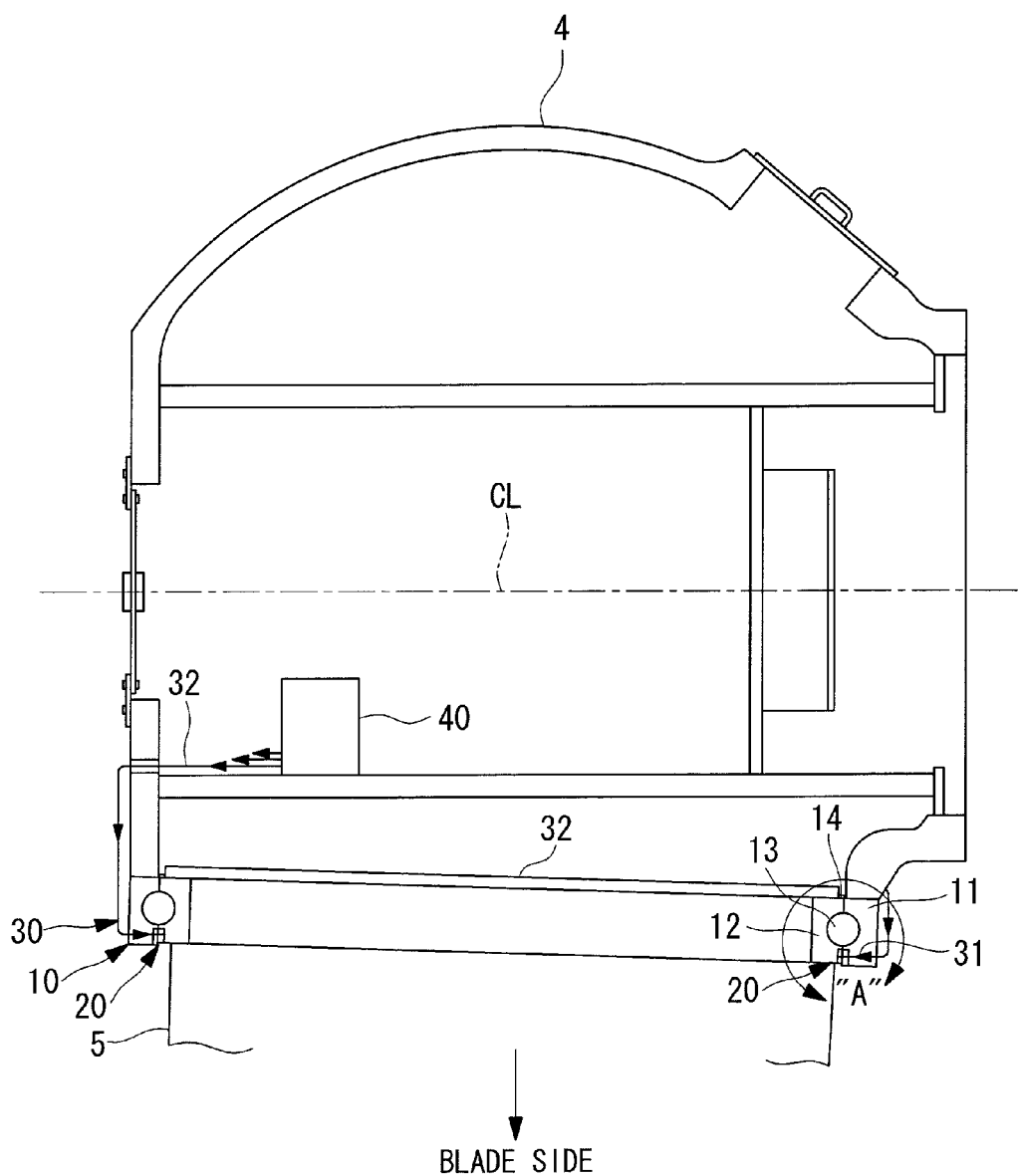
FIG. 2 is a sectional view of an essential portion showing a positional relation between a rotor head and wind turbine blades of the blade rotating ring bearing that variably supports a pitch angle of the wind turbine blades with respect to the rotor head.

As shown in FIGS. 1 and 2, the wind turbine generator 1 includes a pitch control mechanism that can adjust a pitch angle of the wind turbine blades 5 through a blade rotating ring bearing 10 disposed between the wind turbine blades 5 and the rotor head 4. The pitch control mechanism appropriately adjusts the pitch angle of the wind turbine blades 5 in accordance with wind that is natural phenomena, i.e., in accordance with always varying wind speed. The pitch control mechanism sets the pitch angle to an optimal value and controls the rotation speed of the rotor head 4.

The pitch control system turns the wind turbine blades 5 in a desired direction to adjust the pitch angle using a hydraulic mechanism (not shown) as a drive source. Therefore, the wind turbine blades 5 are turnably supported by the rotor head 4 through the blade rotating ring bearing 10.

A rolling bearing is employed as the blade rotating ring bearing 10. The rolling bearing has a such structure that rolling bodies 13 such as a ball bearing or rollers are sandwiched between an outer race 11 and an inner race 12.

In the illustrated example of the structure, the outer race 11 is fixed on the side of the rotor head 4, and the wind turbine blades 5 connected to the inner race 12 can be turned with respect to the outer race 11 and the rotor head 4. To maintain the smooth turning motion of the inner race 12 and the wind turbine blades 5, grease is supplied as lubricant oil to outer peripheral surfaces of the rolling bodies 13 and sliding surfaces of the outer race 11 and the inner race 12 that are contact surfaces with respect to the outer peripheral surfaces of the rolling bodies 13.

In such a blade rotating ring bearing 10, seal mechanisms 14 and 20 in which natural rubber or synthetic rubber is formed on an inner side of the rotor head and both ends of the blade side are mounted on the blade-rolling body holding surfaces 11a and 12a of the outer race 11 and the inner race 12 that are opposed to each other through the rolling bodies 13. Portions of the blade-rolling body holding surfaces 11a and 12a except regions thereof that hold the rolling bodies 13 are opposed to each other through a predetermined gap formed therebetween.

The seal mechanism 14 on the inner side of the rotor head, that is, the seal mechanism 14 located on the side of the rotation center axis CL (inner side) of the rotor head 14 is mounted such as to close a bonding surface end opening 15 that is an exit opening of a gap formed between the blade-rolling body holding surfaces 11a and 12a of the outer race 11 and the inner race 12. In the illustrated example of the structure, the seal mechanism 14 is a seal member having a lip-shaped cross section. One end of the seal mechanism 14 is fixed to an end surface on the side of the inner race 12 by means of a support member 16.

A soft lip tip end 14a is formed on the other end side of the seal mechanism 14. The lip tip end 14a maintains a state where the lip tip end 14a is in contact with the blade-rolling body holding surface 11a of the outer race 11 in a predetermined position. As a result, the bonding surface end opening 15 on the inner side of the rotor head is closed with the seal member 14, and this prevents a foreign matter from entering the inner sliding surface of the blade rotating ring bearing 10.

A pair of seal members 21 and 22 of the blade-side seal mechanism 20 are disposed in a recess 17 formed in a blade-side ends of the outer race 11 and the inner race 12. A space 23 is provided between the seal members 21 and 22 and disposed in the blade axial direction, and the seal mechanism 20 is of a double sealed structure. That is, an inner side seal member (also called "inner seal", hereinafter) 21, the space 23, and an outer side seal member (also called "outer seal", hereinafter) 22 exist in the recess 17 formed in the blade-side ends of the blade-rolling body holding surfaces 11a and 12a in this order from the inner side of the rotor head.

In the illustrated example of the structure, the inner seal 21 and the outer seal 22 are held on the side of the recess forming surface 17a on the side of the outer race 11, and the lip tip ends 21a and 22a of the inner seal 21 and the outer seal 22 are in intimate contact with the recess forming surface 17b on the side of the inner race 12. Lips of the inner seal 21 and the outer seal 22 have the bifurcated lip tip ends 21a and 22a. It is noted that the number of the lip tip ends is not particularly limited, and may be three and more, for example.

A fluid supply passage 30 through which pressurized fluid such as compressed air is supplied is in communication with the space 23. The fluid supply passage 30 is connected to a pressurized fluid supply device 40 provided in the rotor head 4 for example, and includes a fluid flow path 31 formed in the outer race 11 and a fluid pipe 12 provided outside the outer race 11.

A cylindrical exit 33 made of metal or resin for reliably securing a flow path for pressurized fluid between adjacent seal members 21 and 22 is provided at an opening of an exit through which the fluid supply passage 30 is in communication with the space 23.

Since the pressurized fluid supplied to the space 23 pressurizes the seal members 21 and 22 from the side of the space 23 in this manner, the lip tip ends 21a and 22a are pressed against the recess forming surface 17b of a mating sidewall surface. As a result, intimate contact of the lip tip ends 21a and 22a with respect to the recess forming surface 17b on the side of the inner race 12 becomes more strong and reliable. Therefore, a direction oriented outward from the side of the rolling body 13 is sealed by the inner seal 21, and a direction oriented toward the space 23 from outside is sealed by the outer seal 22. Thus, a strong seal structure in both directions can be obtained.

A support member 18 is mounted on a blade-side end surface of the outer race 11, and the seal members 21 and 22 that receive the pressure of the pressurized fluid restrict such that the outer seal 22 does not run out outside of the recess 17.

According to the wind turbine generator 1 of the embodiment, as described above, seal mechanisms 14 and 20 are mounted on both ends of opposed rolling body holding surfaces 11a and 12a of an outer race 11 and an inner race 12 of the blade rotating ring bearing 10 with rolling bodies 13 interposed between both the ends. Sides of the seal mechanisms 14 and 20 closer to the blade are formed into a double layout structure in the blade axial direction having the space 23 between the seal members 21 and 22, pressurized fluid is supplied to the space 23, and lips of the seal members 21 and 22 are pushed against the mating sidewall surfaces. Therefore, a strong seal structure can be formed in both a direction oriented outward of the blade rotating ring bearing 10 from the side of the rolling body 13 and a direction oriented toward the space 23 from the outside of the blade rotating ring bearing 10.

As a result, even if the seal mechanism 20 receives a centrifugal force when the wind turbine generator 1 is operated, the inner seal 21 functions as a strong seal that prevents lubricant oil from flowing outside from the blade rotating ring bearing 10, and the outer seal 22 functions as a strong seal that prevents rain water or the like from entering the blade rotating ring bearing 10.

Therefore, leakage of lubricant oil in the blade rotating ring bearing 10 to outside from the blade-side seal mechanism 20 can be prevented or suppressed.

The pressurized fluid is not limited to the above-described compressed air.

If a compressor that is specifically designed to be disposed is disposed in the rotor head 4 and peripheral air is compressed, the compressed air can easily be supplied. Therefore, it becomes possible to always stably supply compressed fluid. In this case, the pressurized fluid supply device 40 becomes a compressor, and it is possible to drive the pressurized fluid supply device 40 using a portion of electricity generated by the wind turbine generator 1 or using electricity obtained by a special solar cell.

The compressor in this case need not always be operated. For example, a relatively small accumulator tank may be provided and the compressor may be operated intermittently so that a predetermined pressure is maintained.

Compressed air accumulated in a pressure tank disposed in the rotor head 4 may be used as compressed air of the pressurized fluid. In this case, the pressurized fluid supply device 40 becomes the accumulator tank, there is no electricity consumption for driving the compressor on the side of the wind turbine generator 1, and an amount of compressed air required until a periodic inspection can be secured by optimizing a capacity of the pressure tank.

INDUSTRIAL APPLICABILITY

With this configuration, it is possible to stably supply compressed air without consuming electricity generated by the wind turbine generator 1. For compressed fluid in the pressure tank, it is possible to connect a compressor from outside the wind turbine generator 1 at the time of periodic inspection, and to accumulate a pressure. It is preferable to monitor an internal pressure in the pressure tank, and when the internal pressure decreases to a predetermined value or less, an alarm is given to a manager.

According to the embodiment, as described above, even if the blade-side seal mechanism 20 receives a centrifugal force when the wind turbine generator 1 is operated, the seal mechanism 20 supplies compressed fluid to the space 23 and pressurizes the compressed fluid and with this, the seal mechanism 20 simultaneously forms the strong inner seal 21 that prevents lubricant oil in the blade rotating ring bearing from flowing outside and the strong outer seal 22 that prevents rain water or the like from entering the bearing. Therefore, the oil seal structure provided in the blade rotating ring bearing 10 of the wind turbine blade 5 is improved.

Therefore, according to the wind turbine generator 1 having the seal mechanism 20, it is possible to minimize the amount of lubricant oil leaking outside from the blade rotating ring bearing 10, and to enhance the reliability and durability of the wind turbine generator 1.

The invention is not limited to the above-described embodiment, and the invention can appropriately be modified within a range not departing from its subject matter.

REFERENCE SIGNS LIST 1 wind turbine generator
2 wind turbine tower
3 nacelle
4 rotor head
5 wind turbine blade
10 blade rotating ring bearing
11 outer race
11a, 12a rolling body holding surface
12 inner race
13 rolling body
14, 20 seal mechanism
21 inner seal (seal member)
22 outer seal (seal member)
23 space
30 fluid supply passage
40 pressurized fluid supply device

The invention claimed is:

1. A wind turbine generator, comprising:
a rotor head that has wind turbine blades, wherein the rotor head rotates, when the wind turbine blades receive wind power, and drives a power generator disposed in a nacelle to generate electricity, the nacelle is disposed on an upper end of a tower that stands on a foundation such that the nacelle can yaw-slew,
a blade rotating ring bearing that is disposed between the wind turbine blade and a rotor, wherein the wind turbine generator includes a pitch control mechanism to adjust a pitch angle of the wind turbine blades,
seal mechanisms are mounted on both ends of opposed rolling body holding surfaces of an outer race and an inner race of the blade rotating ring bearing with rolling bodies interposed between both the ends, and
sides of the seal mechanisms that are closer to the blades and are formed into a double sealed structure in which a space is provided between seal members and the seal members are disposed in an axial direction of the blades, wherein pressurized fluid is adapted to be supplied to the space, and lips of the seal members are pushed against a mating sidewall surface.

2. The wind turbine generator according to claim 1, wherein the pressurized fluid is compressed air supplied from a special compressor disposed in the rotor head.

3. The wind turbine generator according to claim 1, wherein the pressurized fluid is compressed air accumulated in a pressure tank disposed in the rotor head.

* * * * *